United States Patent
Hsu

(10) Patent No.: US 8,390,168 B2
(45) Date of Patent: Mar. 5, 2013

(54) PERMANENT-MAGNET-LESS MACHINE HAVING AN ENCLOSED AIR GAP

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/360,889

(22) Filed: Jan. 30, 2012

(65) Prior Publication Data

US 2012/0126655 A1 May 24, 2012

Related U.S. Application Data

(60) Division of application No. 12/466,212, filed on May 14, 2009, now Pat. No. 8,110,961, and a continuation-in-part of application No. 12/274,895, filed on Nov. 20, 2008, now Pat. No. 8,264,120.

(60) Provisional application No. 61/199,841, filed on Nov. 20, 2008.

(51) Int. Cl.
*H02K 1/22* (2006.01)
*H02K 1/12* (2006.01)
(52) U.S. Cl. ....................... 310/266; 310/257
(58) Field of Classification Search ............... 310/266, 310/164, 168, 165, 166, 217.017, 178, 257, 310/216.017; *H02K 1/22, 1/12*
See application file for complete search history.

(56) References Cited

U.S. PATENT DOCUMENTS

| 588,602 | A | 8/1897 | Rice |
| 2,796,542 | A | 6/1957 | Bekey et al. |
| 2,987,637 | A | 6/1961 | Bertsche et al. |
| 3,017,562 | A | 1/1962 | Duane |
| 3,132,272 | A | 5/1964 | MacFarlane |
| 3,321,652 | A | 5/1967 | Opel |
| 3,484,635 | A | 12/1969 | DeWitt |
| 3,663,846 | A | 5/1972 | Wagner et al. |
| 4,110,642 | A | 8/1978 | Thiele |
| 4,250,424 | A | 2/1981 | Sento et al. |
| 5,929,541 | A | 7/1999 | Naito et al. |
| 6,608,424 | B2 | 8/2003 | Kusase |
| 6,680,557 | B2 | 1/2004 | Kusase |
| 6,891,301 | B1 | 5/2005 | Hsu |

(Continued)

FOREIGN PATENT DOCUMENTS

| JP | 63195382 | 8/1988 |
| JP | 2001157425 | 6/2001 |

OTHER PUBLICATIONS

Machine translation of JP 2001-157425, "alternator", Hisafumi Kuanai and Ikuyo Aizawa, Jun. 8, 2001.

(Continued)

*Primary Examiner* — Tran Nguyen
*Assistant Examiner* — Michael Andrews
(74) *Attorney, Agent, or Firm* — Brinks, Hofer, Gilson & Lione

(57) ABSTRACT

A permanent magnet-less, brushless synchronous system includes a stator that generates a magnetic rotating field when sourced by an alternating current. An uncluttered rotor disposed within the magnetic rotating field is spaced apart from the stator to form an air gap relative to an axis of rotation. A stationary excitation core spaced apart from the uncluttered rotor by an axial air gap and a radial air gap substantially encloses the stationary excitation core. Some permanent magnet-less, brushless synchronous systems include stator core gaps to reduce axial flux flow. Some permanent magnet-less, brushless synchronous systems include an uncluttered rotor coupled to outer laminations. The quadrature-axis inductance may be increased in some synchronous systems. Some synchronous systems convert energy such as mechanical energy into electrical energy (e.g., a generator); other synchronous systems may convert any form of energy into mechanical energy (e.g., a motor).

14 Claims, 13 Drawing Sheets

U.S. PATENT DOCUMENTS

| | | |
|---|---|---|
| 6,977,454 B2 | 12/2005 | Hsu |
| 7,134,180 B2 | 11/2006 | Hsu |
| 7,135,802 B2 | 11/2006 | Seki et al. |
| 7,270,203 B2 | 9/2007 | Hsu |
| 7,834,512 B2 | 11/2010 | Isogai |
| 2005/0099082 A1* | 5/2005 | Nashiki .................. 310/257 |
| 2006/0197346 A1 | 9/2006 | Maehara |
| 2009/0146511 A1 | 6/2009 | Hsu |
| 2009/0218895 A1 | 9/2009 | Hsu |

OTHER PUBLICATIONS

Fitzgerald, A. E. et al., Chapter 7, "Engineering Considerations," Fig. 7-16, Electric Machinery: The Dynamics and Statics of Electromechanical Energy Conversion; $2^{nd}$ Ed., McGraw-Hill Book Company, New York, NY, Copyright 1961, pp. 362.

Parsa, L. et al., "Five-Phase Interior Permanent Magnet Motor with Low Torque Pulsation," *IEEE*, 2005, pp. 1770-1775.

* cited by examiner

PERMANENT-MAGNET-LESS MACHINE HAVING AN ENCLOSED AIR GAP

PRIORITY CLAIM

This application is a divisional application of U.S. application Ser. No. 12/466,212, filed May 14, 2009 (now U.S. Pat. No. 8,110,961), which claims the benefit of priority from U.S. Provisional Application No. 61/199,841, filed Nov. 20, 2008, and which is a continuation-in-part of U.S. application Ser. No. 12/274,895, filed Nov. 20, 2008 now U.S. Pat. No. 8,264,120. The contents of U.S. application Ser. No. 12/466,212 (now U.S. Pat. No. 8,110,961), U.S. Provisional Application No. 61/199,841, U.S. application Ser. No. 12/274,895, and U.S. application Ser. No. 12/466,169 are each incorporated by reference in their entirety.

GOVERNMENT INTEREST

This application was made with United States government support under Contract No. DE-AC05-00OR22725 awarded by the United States Department of Energy. The United States Government has certain rights in these inventions.

BACKGROUND OF THE INVENTION

1. Technical Field

This disclosure relates to electric machines, and more specifically to synchronous motors and generators.

2. Related Art

Due to advances in form and performance demand for motors is increasing. Reduced sizes and improved reliability have broadened the acceptance of electric motors to industries that include transportation, aerospace, robotics, and healthcare.

Some motors use permanent magnets to generate torque. Because the properties of these materials may vary in time and the raw material costs may be excessive, such materials may be unsuitable for some applications. In vehicles, for example, fuel efficiency may be compromised when a permanent magnetic motor is not actuated to drive a vehicle. The continuous fields of the permanent magnets may resist the driving torque of a vehicle and generate core losses.

SUMMARY

A permanent magnet-less, brushless synchronous system includes a stator that generates a magnetic rotating field when sourced by an alternating current. An uncluttered rotor disposed within the magnetic rotating field is spaced apart from the stator to form an air gap relative to an axis of rotation. A stationary excitation core spaced apart from the uncluttered rotor by an axial air gap and a radial air gap substantially encloses the stationary excitation core. Some permanent magnet-less, brushless synchronous systems include stator core gaps to reduce axial flux flow. Some permanent magnet-less, brushless synchronous systems include an uncluttered rotor coupled to outer laminations. The quadrature-axis inductance may be increased in some synchronous systems. Some synchronous systems convert energy such as mechanical energy into electrical energy (e.g., a generator); some synchronous systems may convert any form of energy into mechanical energy (e.g., a motor).

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE PREFERRED EMBODIMENTS

A synchronous system generates high power density at a high torque to weight ratio. Without permanent magnets, some of these brushless slip-ring-less constructions have a reduced size, lower weights (e.g., due to lightweight materials such as aluminum that may form the frames) and less core losses. In vehicles that may use axial and radial gap motors, there may be little to no core losses when the system runs free without field excitations. The high power density and driving torque of these systems may be used in other applications that have short, intermediate, or long core lengths. Upon performance design options, the reluctance torque component may be selected to locate at about less than or greater than about a ninety degree load angle. Dynamic balances are improved when systems do not include rotating rotor windings. In these systems and others the excitation fields may be cut off to enhance safety, fields may be boosted to increase or reach peak acceleration power in short time periods (e.g., about eighteen seconds), power factors may be optimized (e.g., lowering the loading in inverter applications), and efficiency maps may increase due to the adjustable fields. The synchronous systems may be mass produced and may have higher power densities and lower power costs per kilowatt than some induction systems. Some synchronous systems are highly efficient in comparison to some permanent magnet motor constructions. The systems may be operated as an alternating current machine, a motor, and/or a generator.

Figure 1:
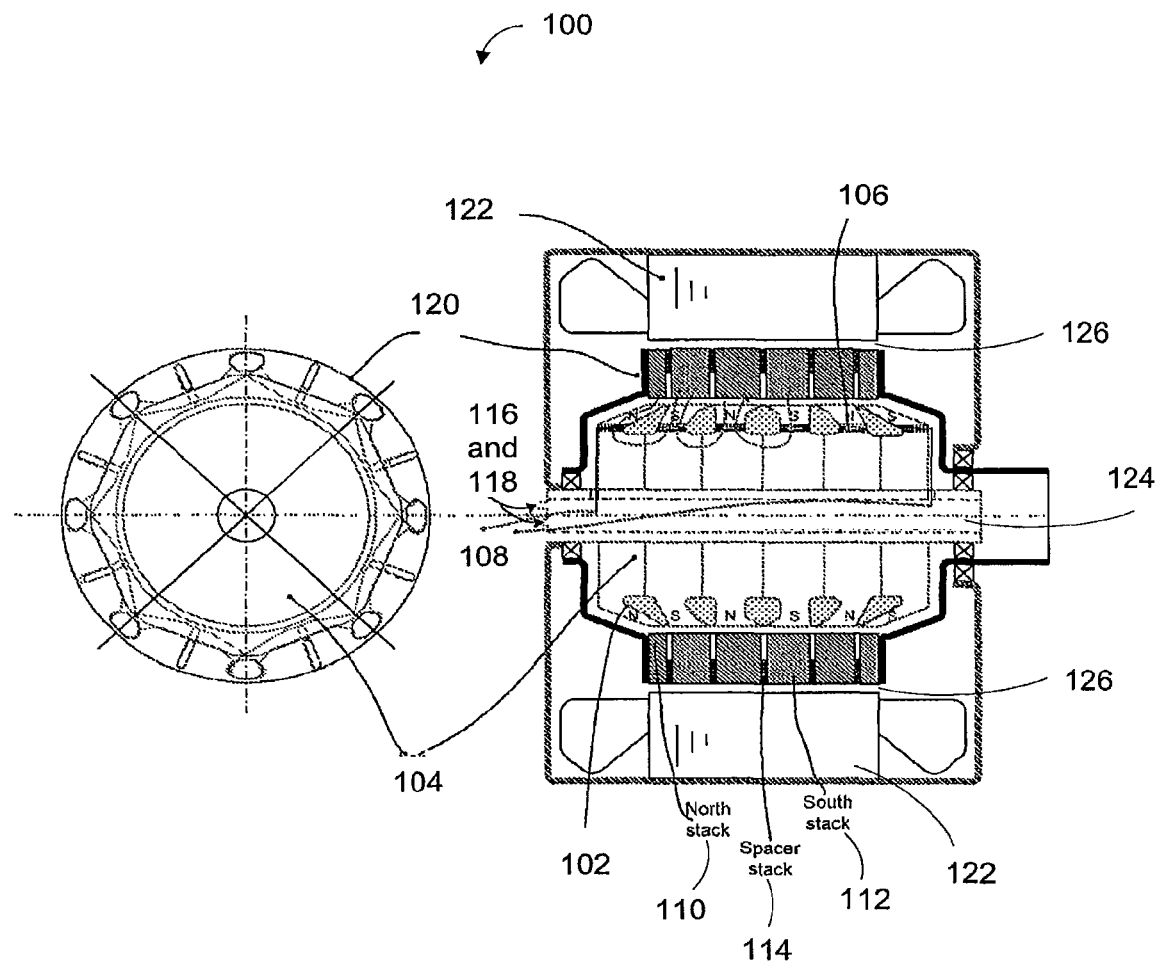
FIG. 1 is a permanent magnet-less machine.

FIG. 1 shows an uncluttered rotor 120 separated from the concentric stator portions 122 by cylindrically shaped air gaps 126. The uncluttered rotor 120 may be centered about a rotational axis and positioned apart from a stationary hollow channel or coolant shaft 124 that may be disposed adjacent to a pair of stationary exciter cores portions 102 (shown in cross section in FIG. 1). In some synchronous systems the exciter core portions 102 are coaxially positioned about an axis of rotation of the uncluttered rotor 120.

The stationary excitation core 104 may include two or more magnetically conducting discs that may include recessed ring-shape like spaces for receiving the excitation conductors or coils 102. In a disc system, the number of discs may be proportional to the available areas for the flux passing axially through the stationary excitation core. The longer the core length of a machine, the greater the number of stationary discs may be used. Many types of materials may form the discs such as solid iron, compressed magnetically conducting powder (such as iron), and other materials that provide good magnetic conduction or ferromagnetic properties. In some applications the discs are not subject to a rotating torque.

In a brushless, permanent magnet-less system 100 shown in FIG. 1, the stationary excitation core 104 may be preformed. During assembly the coils 102 may be laid or positioned in the recessed ring-shape space on the disks. Connections to the coils 102 may be integrated into or may be a unitary part of the discs. Coil terminal pins may be inserted into a conducting socket (connection pin and socket shown as 106) that passes through the disc thickness through an insulator such as one or more insulation tubes. A first and last disc may have an optional radial groove formed or cut into the side surfaces of the discs that may bring the excitation leads 108 to a stationary hollow channel or coolant shaft 124.

An uncluttered rotor 120 positioned between the pair of cylindrical stator portions may include two or more uncluttered rotor pole stacks 110 and 112 that are separated by axially centered annulet dielectrics or cylindrical air gaps, for example, and spacer stacks 114. The uncluttered rotor 120 may be comprised of many materials including solid or compressed powder, laminations, punchings of magnetically conducting materials, etc. The construction and material may further include other structures and forms including those described in U.S. Pat. Nos. 7,270,203, 7,134,180, 6,977,454, and 6,891,301 that are incorporated by reference. In some systems, a hollow center channel may receive a stationary hollow center shaft 124 that may act as an excitation lead egress, cooling channel or tube that has a coolant inlet and outlet 116 and 118.

Figure 2:
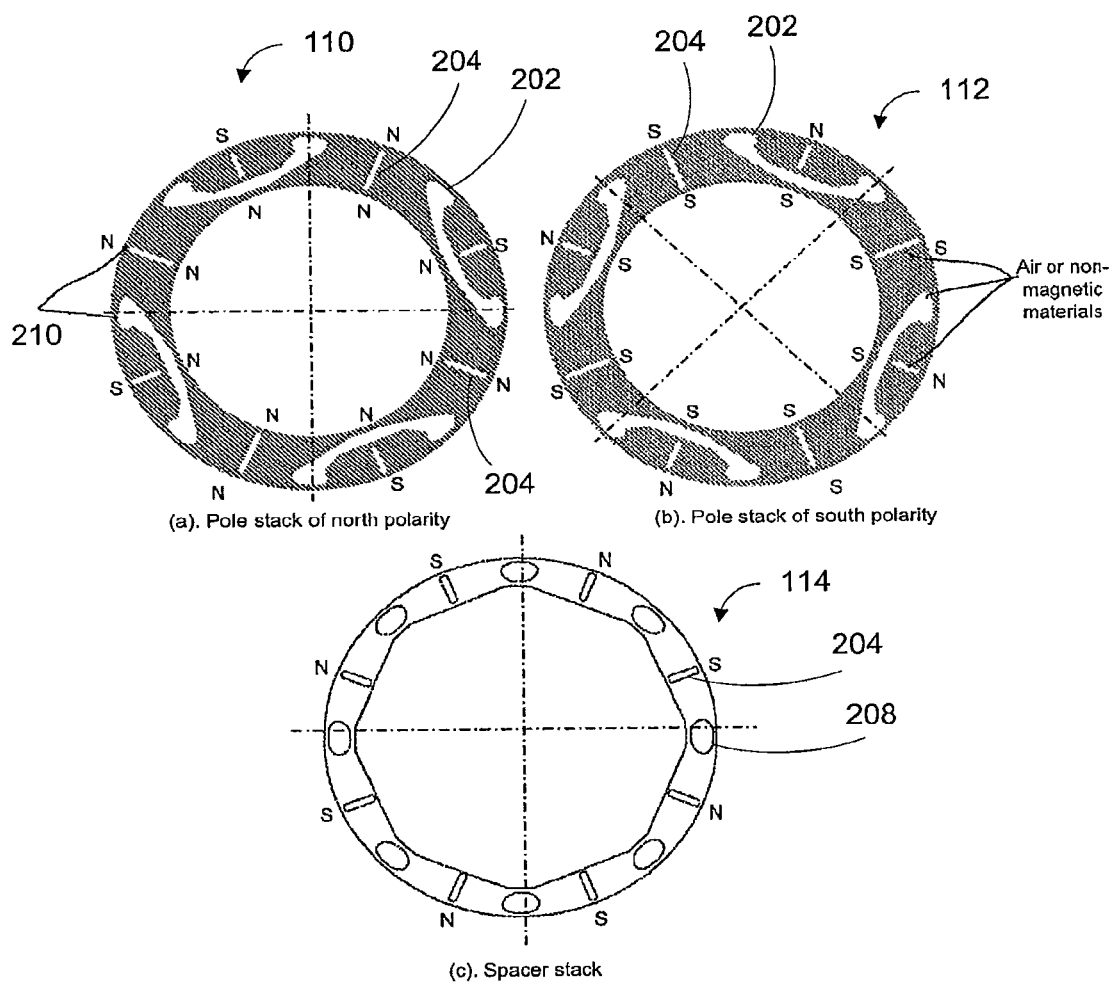
FIG. 2 shows a north polarity, south polarity, and spacer rotor stacks.

FIG. 2 shows exemplary 8-pole stacks that may form an exemplary uncluttered-rotor stack 120. The stack may be made of laminations, punchings, or through other materials and processes. When viewed from the outer diameter of the uncluttered rotor stacks (2a, 2b, and 2c), the number of magnetically isolated sections may equal the number of poles that are about equally spaced apart about an outer periphery. While the polarity along or near the outer peripheral surface alternate, the inner circumference of each of the north polarity and south polarity pole stacks (2a or 2b) maintain (or face) a common (e.g., one) polarity. The inner linear periphery or substantially linear periphery (e.g., inner polygonal surfaces) of the spacer stacks 114, maintain a neutral polarity (or do not face a polarity). The non-conducting (or magnetically isolated) channels, materials, punchings, and/or short radial channels 204 and oblate spheroid shapes 208 in the spacer stacks 114 are nearly equally spaced about the annulus of the spacer stacks 114.

The non-conducting (or magnetically isolated) channels, materials, punchings, and/or kidney-like channels 202 and short radial channels 204 (or dielectrics shown in FIG. 2) may be nearly identical and almost equally spaced about the annulus of the north polarity and south polarity rotor stacks 110 and 112 (2a and 2b), respectively. Between the north polarity and south polarity stacks 110 and 112, the channels, materials, punchings, and/or kidney-like 202 and radial shapes 204 (hereinafter referred to as the channel or channels) are rotated about one hundred and eighty electrical degrees apart.

When formed through a fabrication process, the magnetically isolated sections of the rotor stacks may be formed by the punched out or preformed channels. The different sections of the channels may be mechanically coupled to other layers or rotor pieces by thin bridges 210. Multiple thin bridges 210 may be used in high speed applications. In some systems, the channels may partially enclose a dielectric, non-magnetic materials, or a cooling (e.g., coolant) media.

Figure 3:
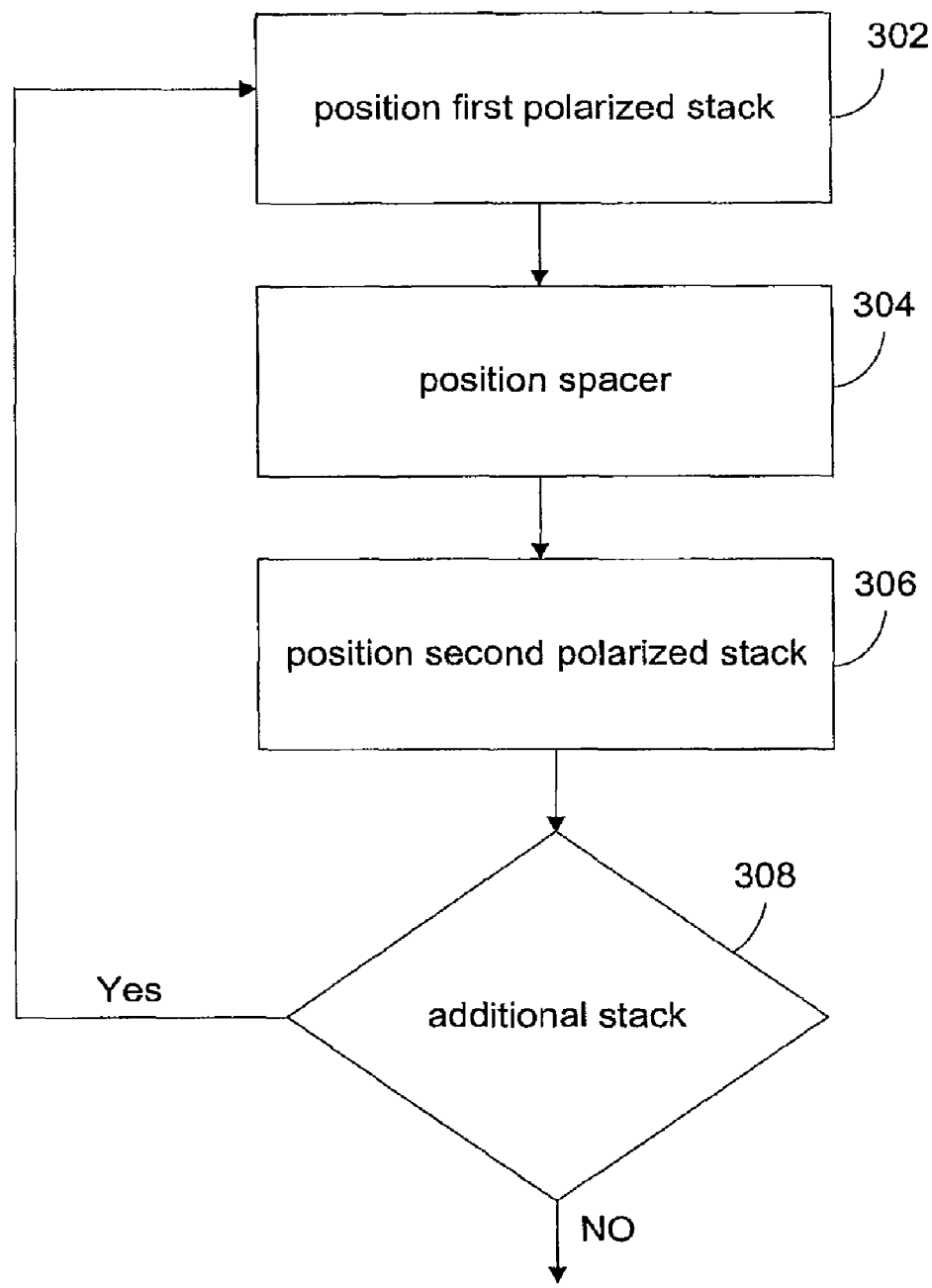
FIG. 3 is a process of assembling an uncluttered rotor.

During the rotor assembly described in FIG. 3 the channels of a stack sharing a common inner polarity may be positioned adjacent to a spacer stack separated by an axially centered annulet dielectric or air gap at 302 and 304. A second stack having an opposite inner polarity may be disposed adjacent to an opposite side of the spacer stack in a rotated position. In some synchronous systems, the second stack is rotated about 180 electric degrees from the coordinate position of the first stack at 306. A second axially centered annulet dielectric or air gap may be partially enclosed by the opposite outer surface of spacer stack and an outer surface of the second stack. As more stacks are added, the same process may be repeated at 308.

Figure 4:
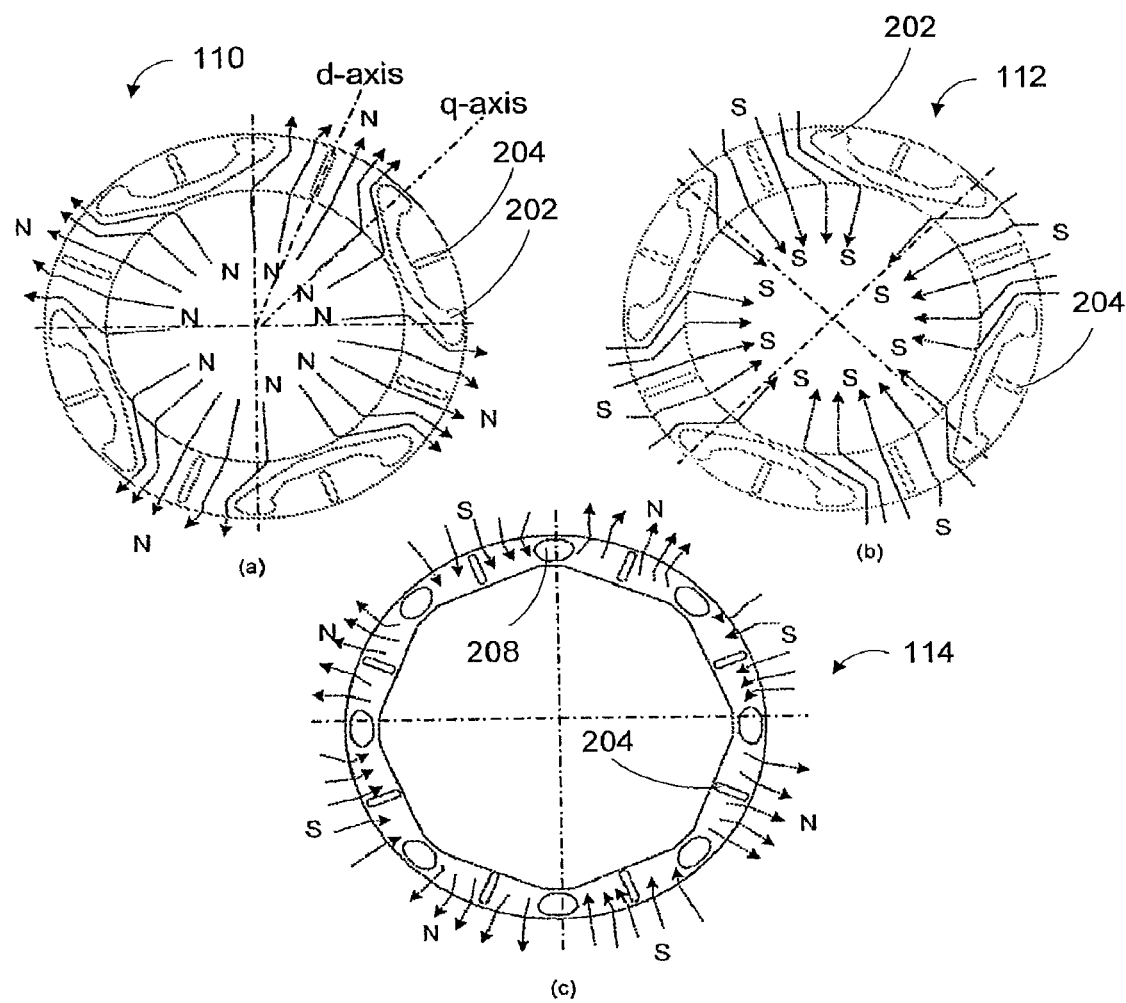
FIG. 4 shows radial flux paths of the rotor stacks.
Figure 5:
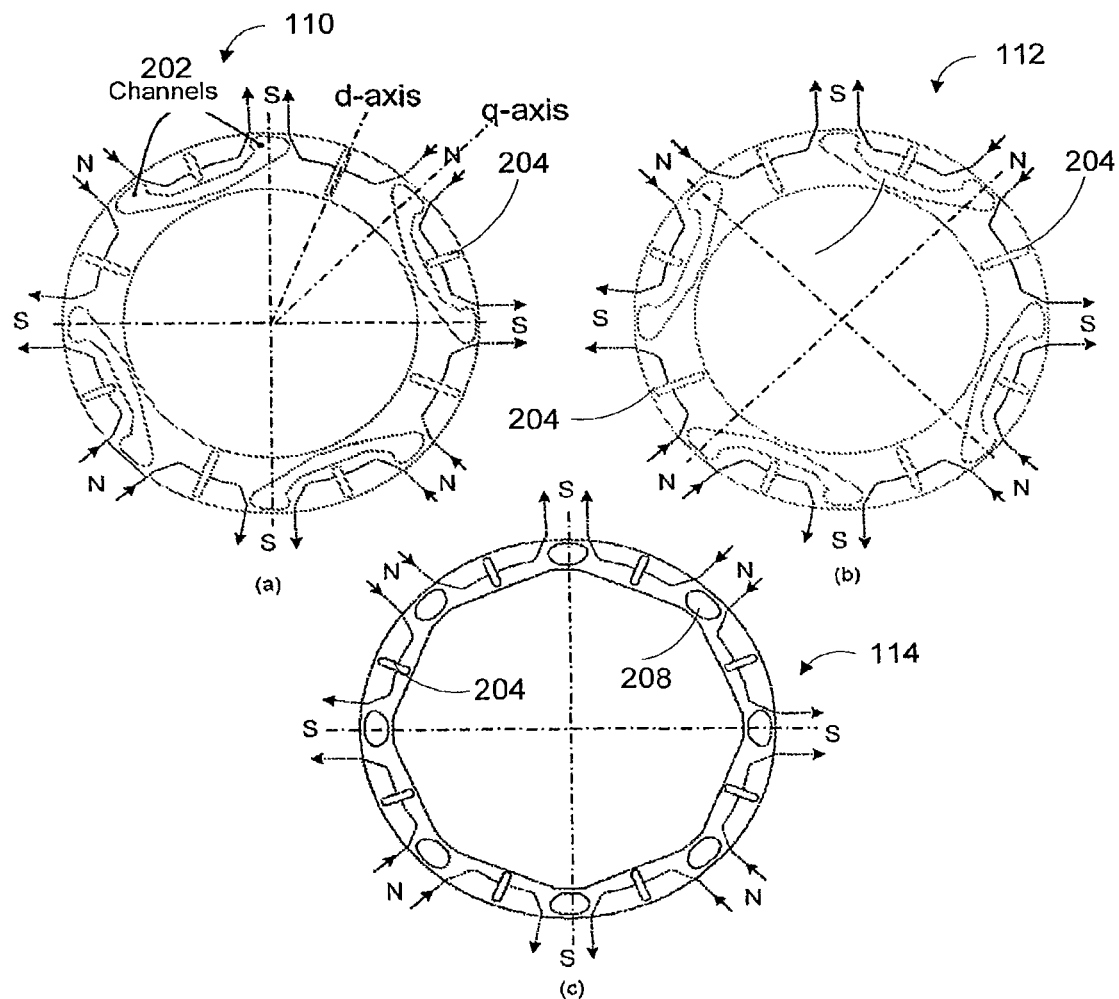
FIG. 5 shows the quadrature-axis flux paths through the rotor stacks.

FIG. 4 shows the radial flux paths of the rotor stack. FIG. 4a shows the direct-axis rotor excitation radial flux paths in the north polarity stack 110; FIG. 4b shows the direct-axis rotor excitation radial flux paths in the south polarity stack 112; and FIG. 4c shows the direct-axis rotor excitation radial flux paths in the spacer stack 114. When a magnetic field is produced by the excitation coils the magnetic flux may flow outward (FIG. 4a), inward (FIG. 4b), or may flow in multiple directions (as shown in FIG. 4c) distributed about an axis of rotation of the uncluttered rotor stack 120. The quadrature axis flux paths are shown in FIG. 5. FIG. 5a shows the quadrature axis fluxes passing though the north polarity stack 110. FIG. 5b shows the quadrature axis fluxes passing through the south polarity stack 112. FIG. 5c shows the quadrature axis flux paths passing through the spacer stack 114. The magnetically isolating channels 202 and 204 shown in FIG. 5 limit and direct the flow of the quadrature-axis flux (facing the q-axis) produced by the rotating magnetic field generated by the stator. The quadrature-axis fluxes converge at designated portions by the shapes of the non-conducting channels. This structure may produce a difference between the direct and quadrature axes that may enhance the reluctance torque component of the synchronous system. Alternatively, when all of the channels 204 are removed, the q-axis flux can flow easily; this makes the q-axis inductance greater than the d-axis inductance to meet some design needs.

Figure 6:
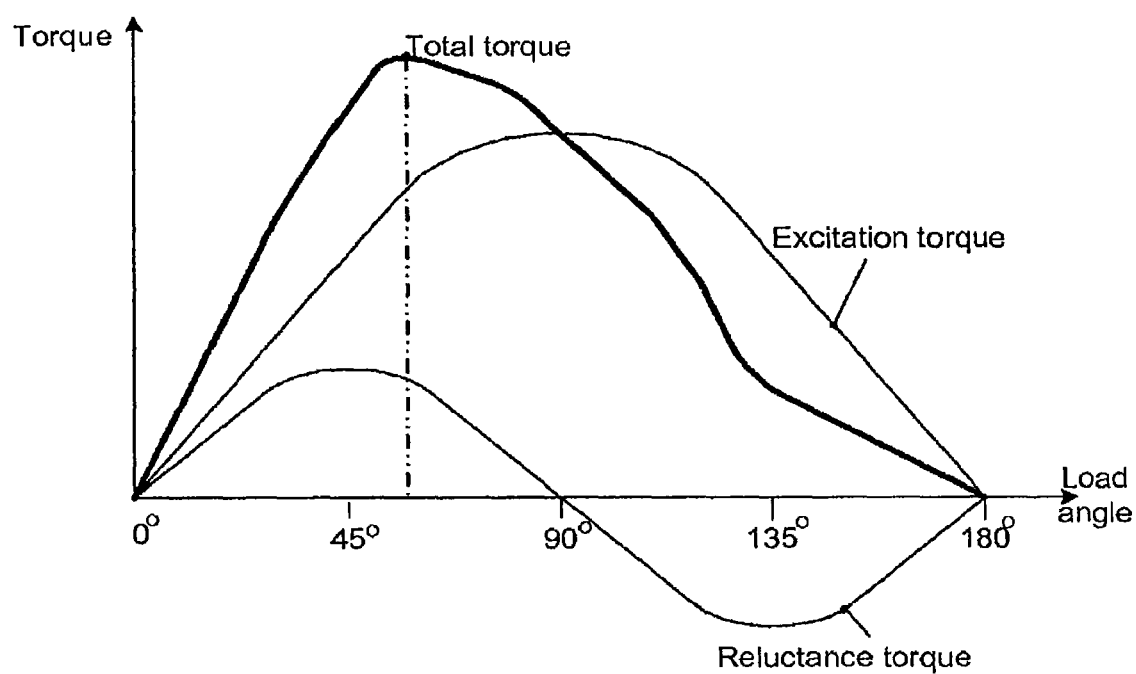
FIG. 6 is a graphical illustration of torque versus load angles for an exemplary case.

FIG. 6 is a graphical illustration of torque versus load angles of an exemplary synchronous system. A peak torque occurs at a load angle less than 90 electric degrees. This indicates the combination of the magnet torque and reluctance torque produced by the system. In some systems a greater q-axis inductance than the d-axis inductance is preferred. In those systems the peak torque occurs at a load angle greater than 90 electric degrees (not shown).

Figure 7:
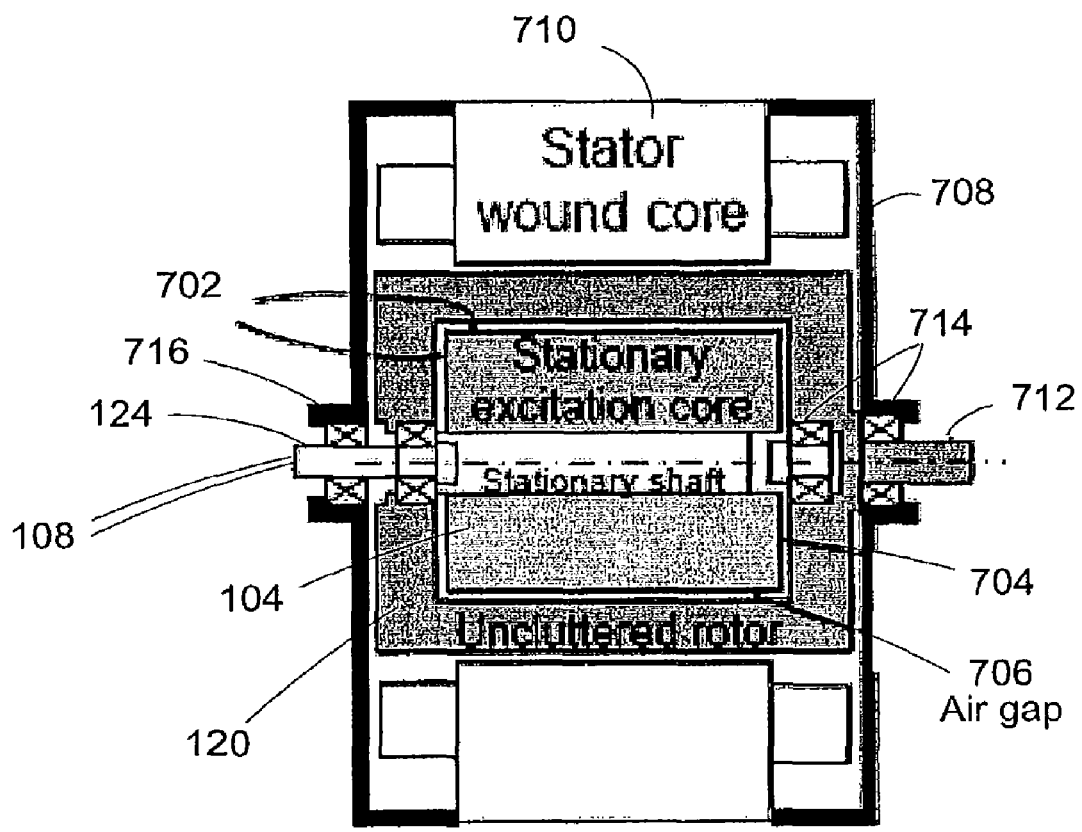
FIG. 7 is a permanent magnet-less machine with an axial and a radial air gap.

FIG. 7 shows a permanent magnet-less machine. The stationary excitation core 104 is enclosed by a substantially bilateral symmetrical trapezoidal channel 702 shown in cross section as a radial 704 and an axial 706 air gap in cross-section. The air gaps 704 and 706 transfer magnetic flux produced by the excitation coil(s) or conductors to the uncluttered rotor 120. As the capacity of the air channel 702 increase, the magnetic flux produced by the excitation coil(s)

or conductors increase. At greater dimensions, less excitation current is required to produce a desired magnetic flux.

A mechanical support configured as a frame 708 covers and protects the stationary excitation core 104, uncluttered rotor 120, and stator 710 while supporting the coolant shaft 124 and a rotatable shaft 712. The frame 708 may support the rotatable shaft 712 directly or intermediately through annular guides 714 such as bearings that reduce friction. Stationary annular guides 716 may support the stationary hollow channel or coolant shaft 124 that supports the stationary excitation core 104. The frame 708 may be made of a non-magnetic material as it may serve a mechanical non-magnetic function.

The stationary excitation core 104 may comprise one, two or more excitation coil(s) or conductors. A stationary coil 102 of FIG. 8 may comprise toroidal-like or ring-like elements formed by rotating a closed loop (e.g., like an ellipse, circle, or irregular curve) about an axis. The stationary coil 102 wraps around the excitation core 104 near its perimeter adjacent to the axial air gap 706.

Figure 8:
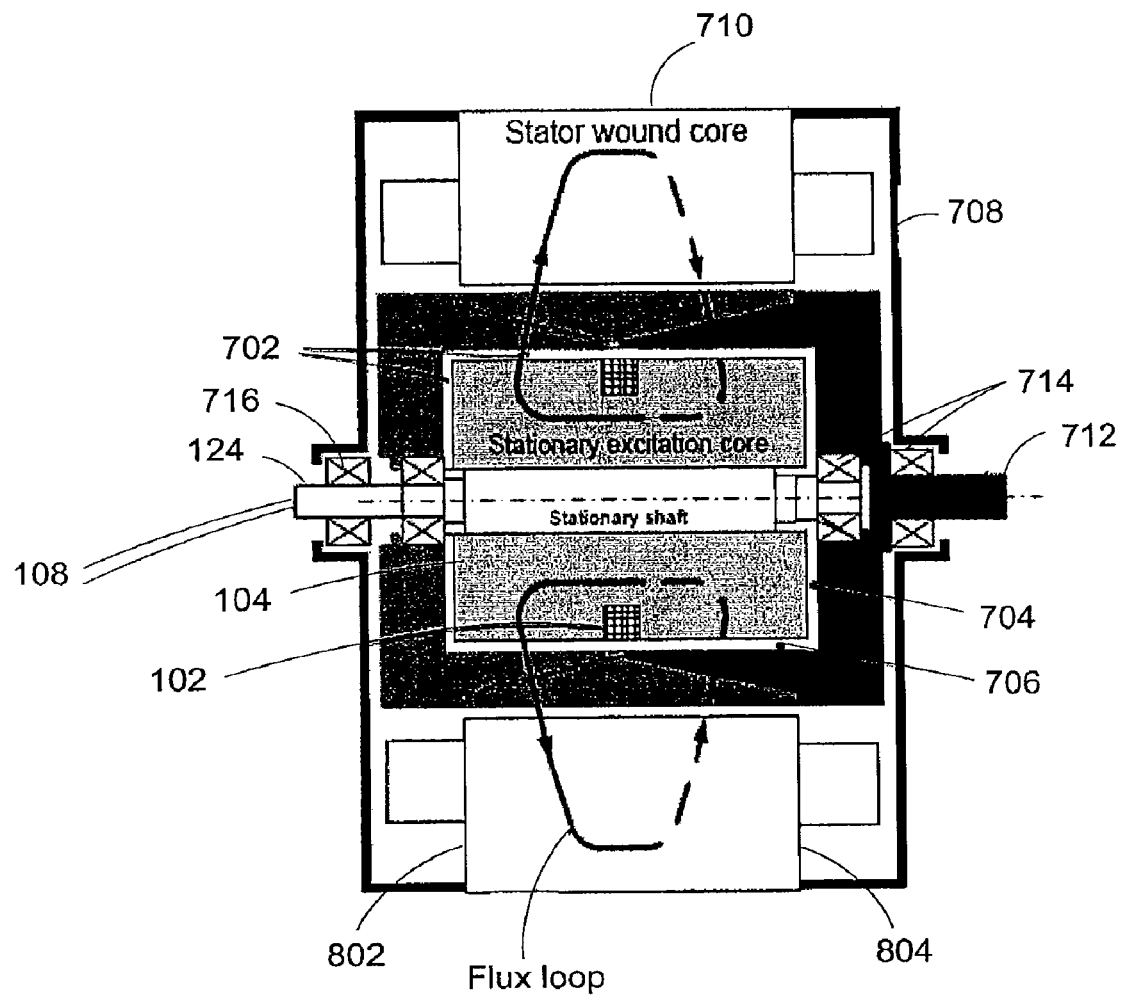
FIG. 8 shows an exemplary flux loop of the machine of FIG. 7.
Figure 13:
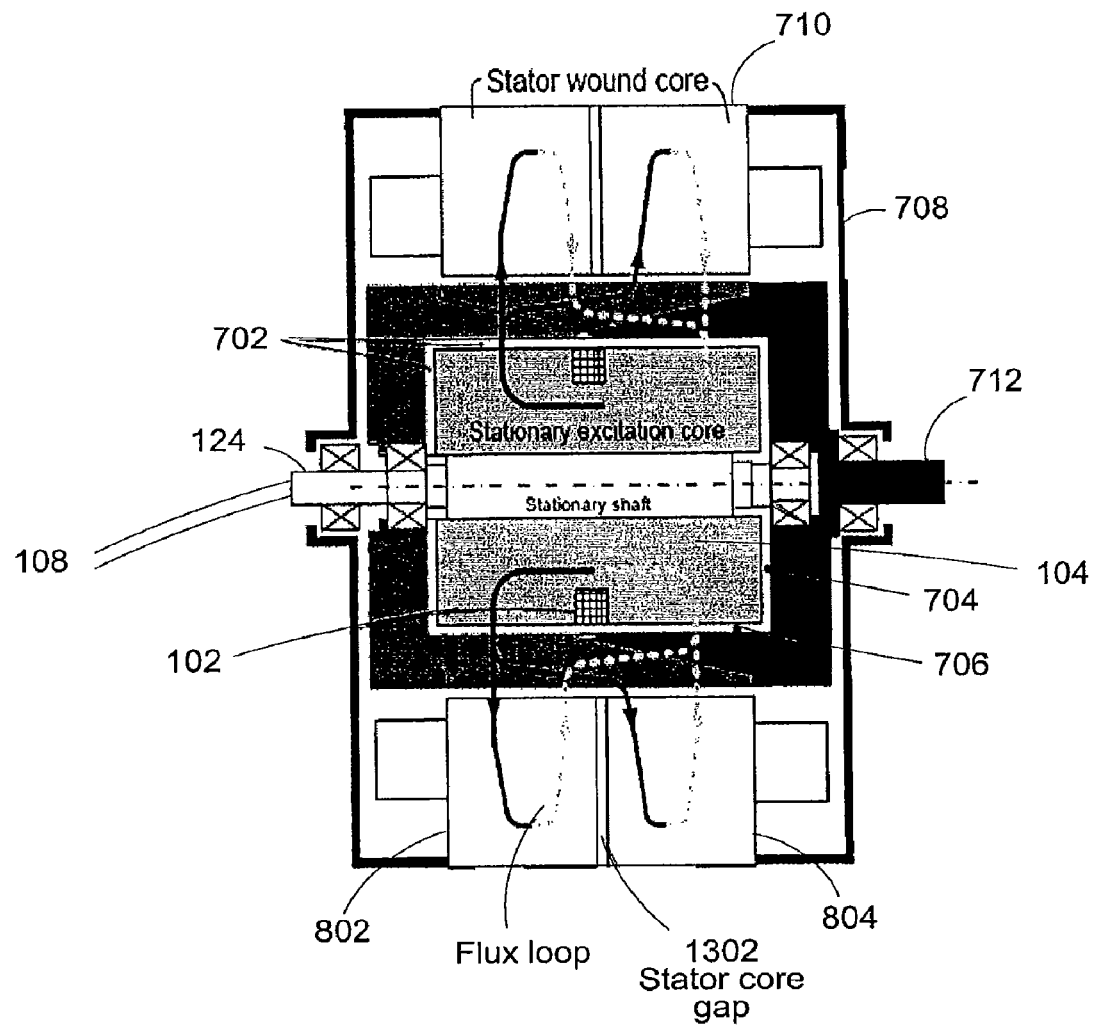
FIG. 13 is an alternative permanent magnet-less machine having an enclosed air gap and stator core gap.

The distribution of rotor flux to the stator 710 in FIG. 8 may not be evenly distributed along the length of the stator 710 core. The flux path is longer (shown by the continuous line of the flux loops) for the flux flowing from the stationary excitation core 104 to the stator 710 than the flux path (shown by the discontinuous line of the flux loops) from the stator 710 to the stationary excitation core 104 In those synchronous system in which the stator 710 comprises stacks of laminations, a dielectric gap or channel between a proximal 802 and a distal 804 end of the stator 710 may minimize or block the unevenness of some axial flux flows. In some synchronous systems, the dielectric gap or channel may pass entirely or partially through the stator 710. In these and other systems the channel or gap may be positioned at a substantially central position within the stator 710 core between the proximal 802 and the distal 804 ends. In FIG. 13, a grove or stator core gap 1302 is formed or cut into the stator 710 for each stationary coil 102 of the excitation core 104. The groove or stator core gap 1302 reduces core losses in the stator 710 due to the uneven flux density distribution in the axial direction of the stator 710.

Figure 9:
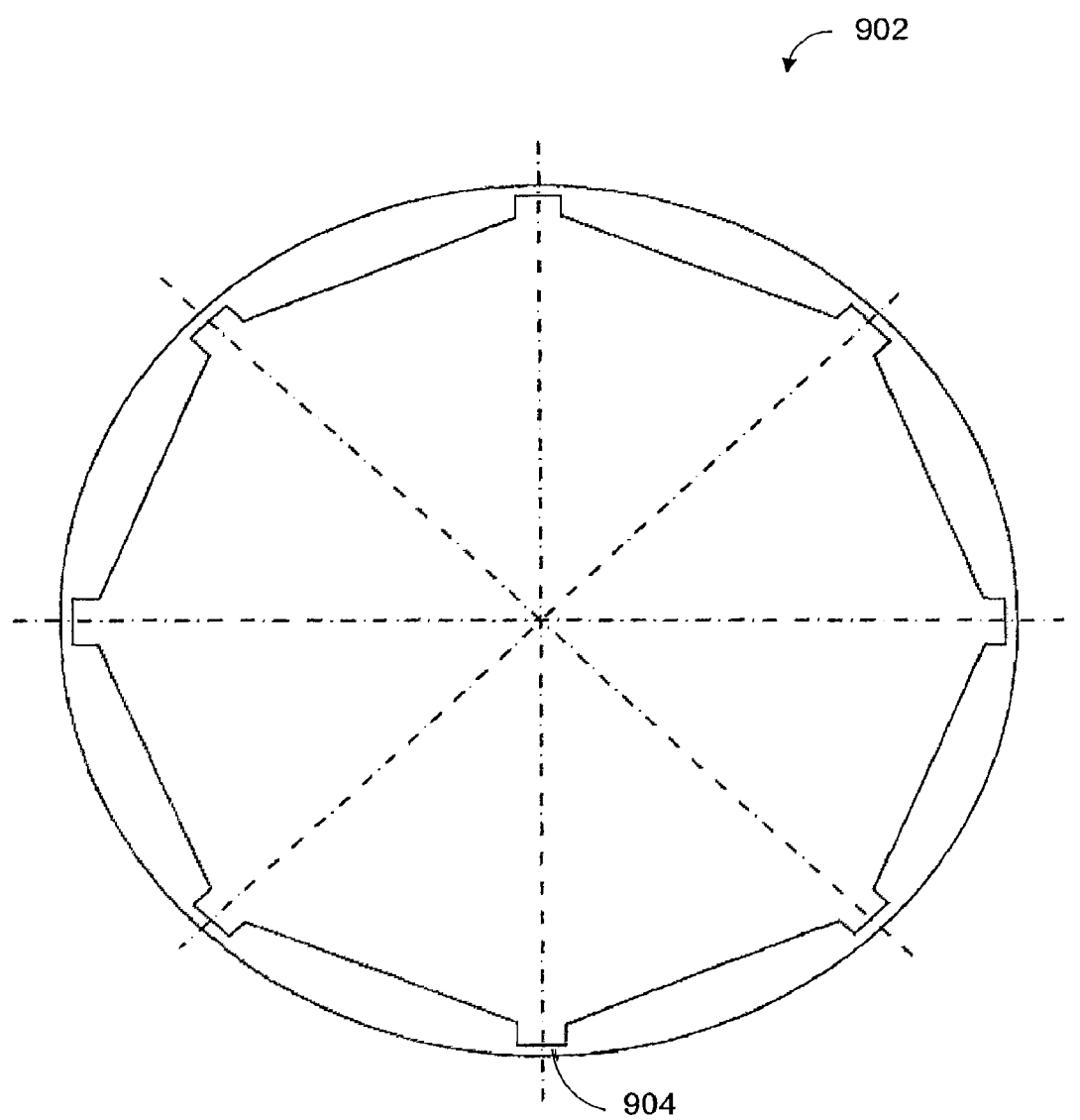
FIG. 9 is an exemplary lamination ring.

To reduce core losses on the surfaces of a solid uncluttered rotor 120, an out ring of laminations may couple the perimeter of the uncluttered rotor 120. In an eight-pole machine, a solid (e.g., forged) core may couple the laminations 902 shown in FIG. 9. Each annulus-like shaped lamination may be made of silicon steel and include multiple narrow bridges 904 of a width dimensioned to maintain the integrity of the lamination during assembly or handling. In some synchronous systems, the dimensions of the narrow bridges 904 may be sized to counter the effect of centrifugal force.

Figure 10:
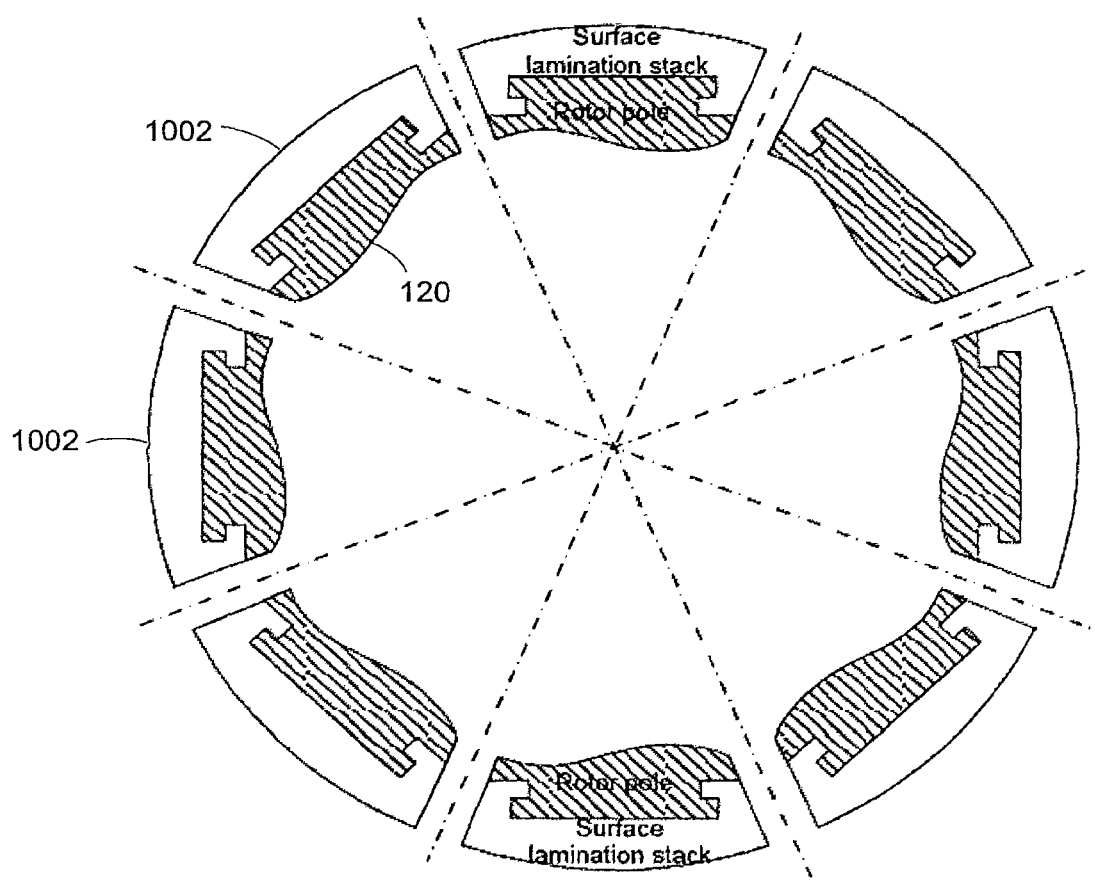
FIG. 10 is a surface lamination stack coupled to a rotor.

To reduce or eliminate the flux leakages that may impede system performance, an outer lamination stack may comprise separate multi-piece lamination stacks 1002 that couple the solid core that is partially shown by the hatched area in FIG. 10. The multi-piece laminations may slide on the solid rotor pole portions (the uncluttered rotor 120 is partially shown in cross-section) that may be retained like a keyway or a tongue and groove like engagement. In FIG. 10 the uncluttered rotor 120 does not include any bridges in this alternative system.

Figure 11:
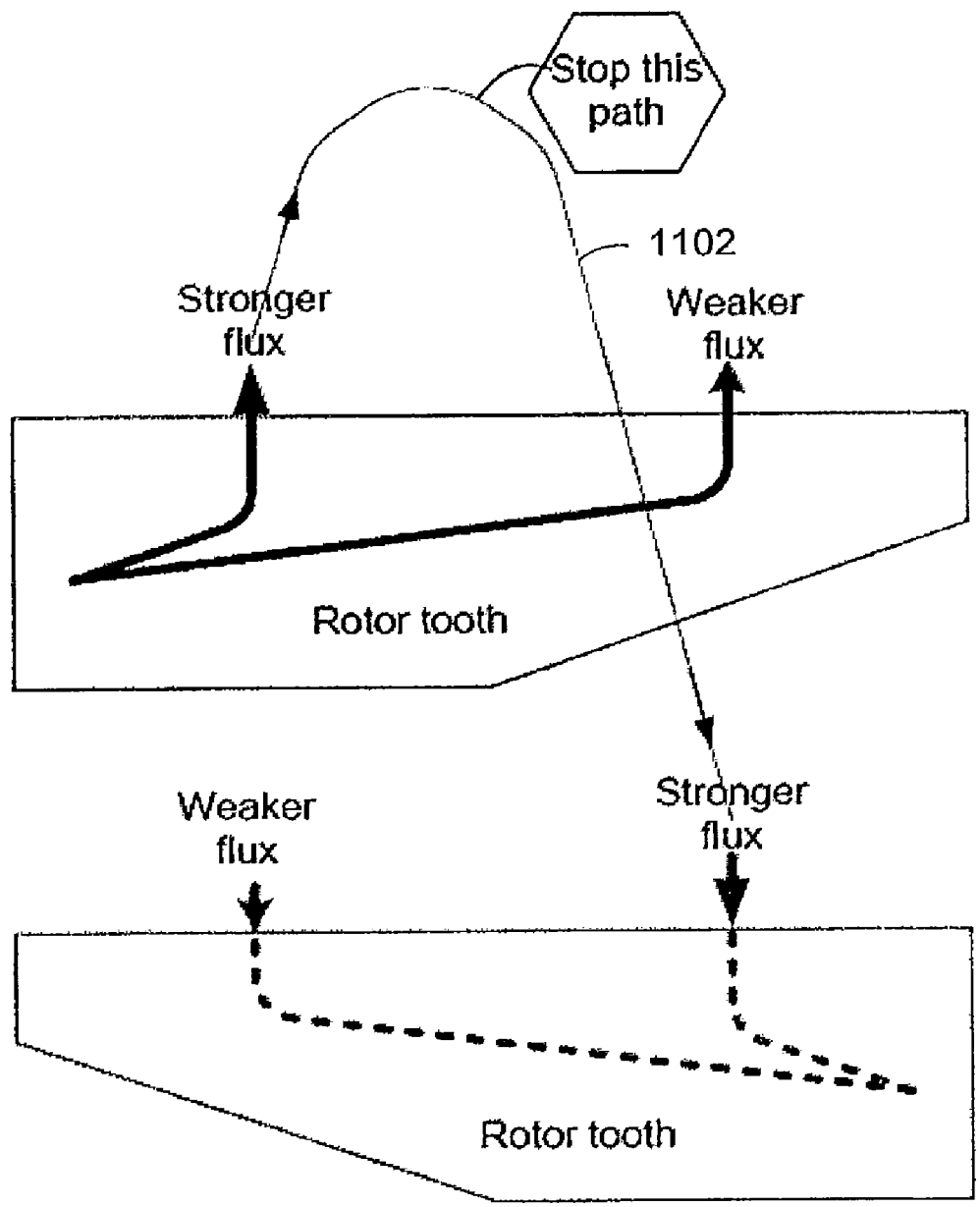
FIG. 11 is an exemplary flux path having an uneven flux density distribution.
Figure 12:
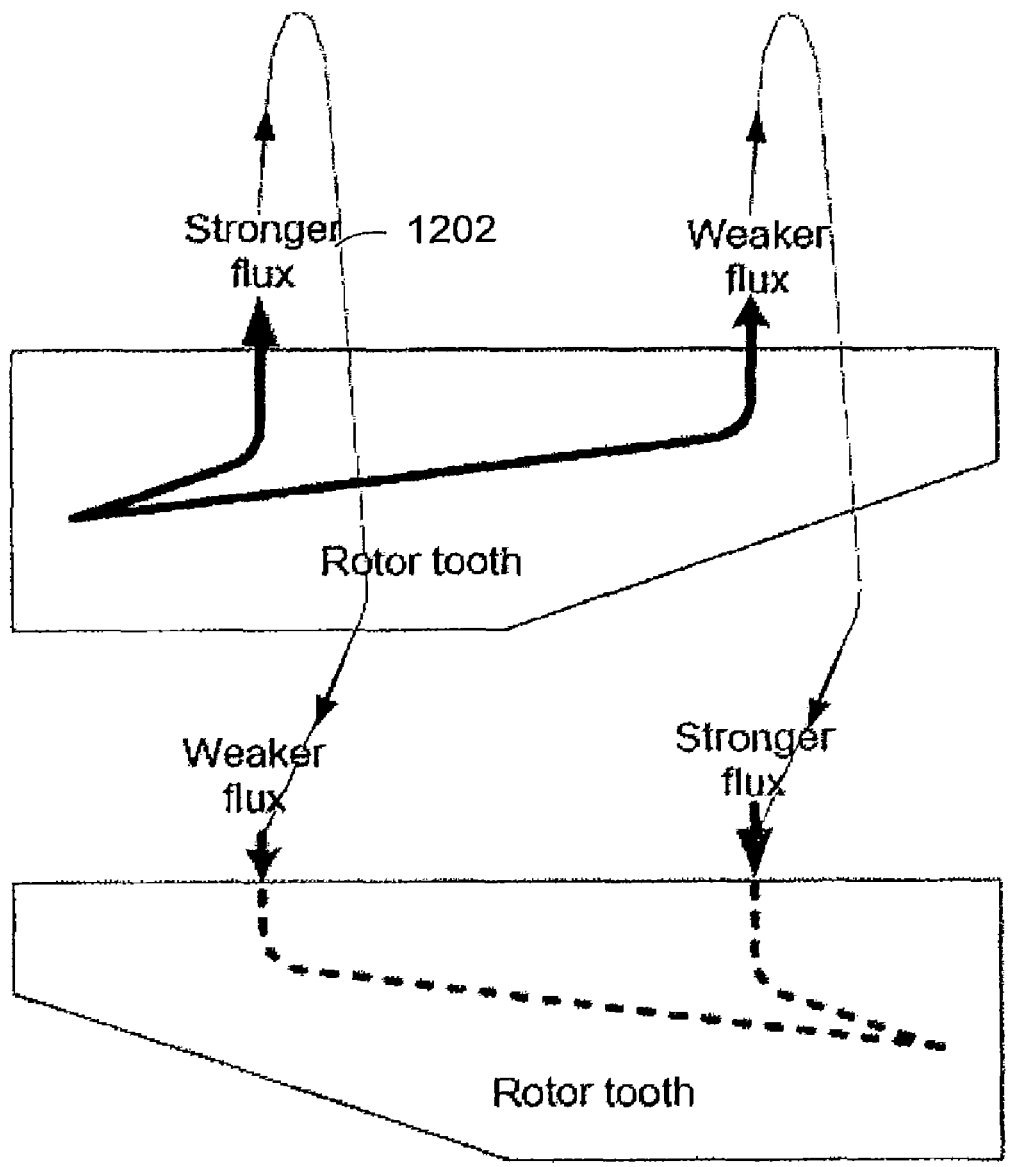
FIG. 12 is an exemplary flux path.

FIG. 11 shows the undesired flux path between two teeth of the rotor or claws. From a strong flux portion, flux flows from the left side of the multi-piece rotor claw to the right side of an oppositely polarized claw through path 1102. Flux tends to flow from a stronger portion (through the stator) to the stronger downward portion shown in FIG. 11. Compared to FIG. 12, the axial length of path 1102 of FIG. 11 is longer than the alternative path 1202 of FIG. 12.

To block the axial path through the stator 710, the groove or stator core gap 1302 shown in FIG. 13 may be filled or enclosed by a non-magnetic conductor. The non-magnetic conductor or insulation may comprise many materials since the non-magnetic conductor is not subject to mechanical or centrifugal force in some applications. Other systems rely only on the length and/or depth of the separation to block the core loses that may be caused by the non-uniformly distributed flux.

Other alternate systems and methods may include combinations of some or all of the structure and functions described above, incorporated by reference, or shown in one or more or each of the figures. These systems or methods are formed from any combination of structure and function described or illustrated. Some alternative systems or devices interface structures that transport person or things. The system may convert one form of energy into another (e.g., convert a form of energy such as electric energy into mechanical power and/or mechanical power into other forms of energy such as electric energy).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A permanent magnet-less, brushless synchronous system comprising:
   a stator that generates a magnetic rotating field when sourced by an alternating current;
   an uncluttered rotor disposed within the magnetic rotating field and spaced apart from the stator to form an air gap relative to an axis of rotation; and
   a stationary excitation core spaced apart from the uncluttered rotor by an axial air gap and a radial air gap,
   where the uncluttered rotor comprises a plurality of rotor pole stacks configured to have quadrature flux paths, the flux paths being partially bounded by dielectric channels passing through each of the plurality of rotor pole stacks, and
   where the stator comprises a plurality of teeth juxtaposed in an axial direction, the teeth including a return path for interconnecting the teeth to a plurality of alternating phases.

2. The permanent magnet-less, brushless synchronous system of claim 1 where the axial air gap and radial air gap comprise a substantially bilateral symmetrical area.

3. The permanent magnet-less, brushless synchronous system of claim 2 where each of the rotor stacks comprises a plurality of thin bridges that mechanically link the poles of the rotor.

4. The permanent magnet-less, brushless synchronous system of claim 2 where the uncluttered rotor comprises stacked laminations configured to facilitate the quadrature flux paths and direct axis flux paths.

5. The permanent magnet-less, brushless synchronous system of claim 4 where the flux flowing in the quadrature flux paths converge by the dielectric channels passing through the plurality of rotor pole stacks.

6. The permanent magnet-less, brushless synchronous system of claim 1 where the uncluttered rotor comprises a plurality of rotor pole portions and each rotor pole couples a lamination stack.

7. The permanent magnet-less, brushless synchronous system of claim 6 where an outer periphery of the uncluttered rotor lacks a narrow bridge.

8. The permanent magnet-less, brushless synchronous system of claim 1, wherein the stator further comprises a plurality of stator cores separated by a blocking stator core gap.

9. The permanent magnet-less, brushless synchronous system of claim 8 where the blocking stator core gap is filled with a non-magnetic insulation.

10. A permanent magnet-less, brushless synchronous system comprising:
   a stator that generates a magnetic rotating field when sourced by an alternating current;
   an excitation core that comprises two or more magnetically conducting coils positioned apart from the stator; and
   an uncluttered rotor disposed within the magnetic rotating field and spaced apart from the excitation core by a continuous air gap that surrounds the excitation core;
   where the stator comprises a wound core, and
   where the uncluttered rotor comprises a plurality of teeth and the stator further comprises a blocking element that substantially blocks an axial flux flow through the stator.

11. The permanent magnet-less, brushless synchronous system of claim 10 where the excitation core is axially disposed about a hollow substantially cylindrical channel axially coincident with a rotatable shaft.

12. The permanent magnet-less, brushless synchronous system of claim 11 where the hollow substantially cylindrical channel comprises a stationary channel that includes an inlet and an outlet.

13. The permanent magnet-less, brushless synchronous system of claim 10 where the uncluttered rotor couples a plurality of laminations that form discontinuous stacks having ferromagnetic properties.

14. The permanent magnet-less, brushless synchronous system of claim 13 where the plurality of rotor pole stacks comprises stacked laminations configured to form the quadrature flux paths when the stator is sourced by an alternating current, and the stator is separated centrally by a separate dielectric channel that resists flux flow.

* * * * *